United States Patent [19]

Gemmani

[11] 4,394,894
[45] Jul. 26, 1983

[54] MACHINE FOR MACHINING PANELS, PLANKS AND SECTIONS OR SIMILAR, IN PARTICULAR FOR WOOD AND THE DERIVATIVES THEREOF

[75] Inventor: Giuseppe Gemmani, Rimini, Italy

[73] Assignee: SCM Finanziaria S.p.A., Rimini, Italy

[21] Appl. No.: 200,075

[22] Filed: Oct. 24, 1980

[30] Foreign Application Priority Data

Oct. 25, 1979 [IT] Italy .................. 3519 A/79

[51] Int. Cl.³ ............................................. B65G 47/00
[52] U.S. Cl. .................................... 198/339; 198/621; 144/245 A; 83/155
[58] Field of Search ............... 198/339, 341, 626, 614, 198/621, 485, 648; 414/677; 83/155; 144/245 A, 242 D

[56] References Cited

U.S. PATENT DOCUMENTS

| | | |
|---|---|---|
| 1,934,087 | 11/1933 | Payzant et al. |
| 2,117,641 | 5/1938 | Westlund .............................. 198/626 |
| 2,173,587 | 9/1939 | Huffman . |
| 2,789,595 | 4/1957 | Peterson . |
| 2,968,325 | 1/1961 | Wandvik . |
| 3,283,918 | 11/1966 | Devol .................................. 198/341 |

FOREIGN PATENT DOCUMENTS

| | | |
|---|---|---|
| 311030 | 10/1973 | Austria . |
| 327524 | 10/1920 | Fed. Rep. of Germany . |
| 540942 | 12/1931 | Fed. Rep. of Germany . |
| 1920574 | 3/1971 | Fed. Rep. of Germany . |
| 1312533 | 11/1962 | France . |
| 1314493 | 11/1963 | France . |
| 2311734 | 3/1979 | France . |
| 2407056 | 5/1979 | France . |
| 2290373 | 1/1980 | France . |

Primary Examiner—Joseph E. Valenza
Attorney, Agent, or Firm—Fleit, Jacobson & Cohn

[57] ABSTRACT

A machine for machining workpieces, such as panels, planks, and sections. The machine includes a conveyor for conveying workpieces in an infeed direction past a plurality of operating stations fixed in position along a conveying line. A carriage cooperates with the conveyor to support and feed the workpieces. The carriage is coupled with the conveyor for conjoint movement in the feeding direction of the workpieces. The carriage cooperates with other members to form articulated quadrilateral that supports a bar in such manner that the angle formed between the axis of the bar and the conveying line is adjustable. The bar, together with the conveyor, provides support for workpieces being machined.

13 Claims, 6 Drawing Figures

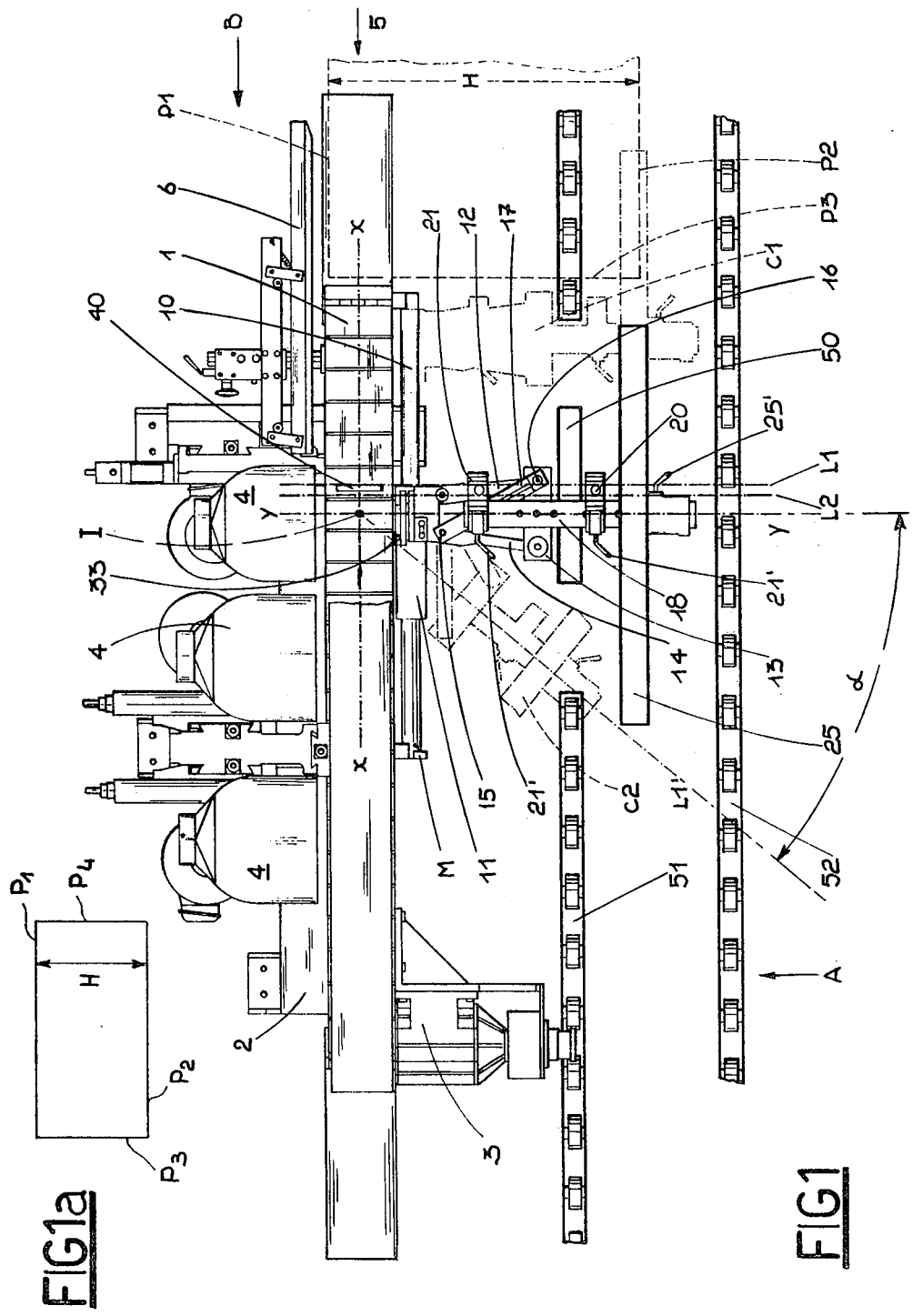

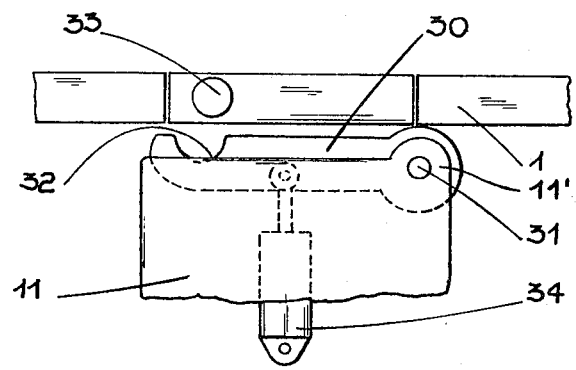
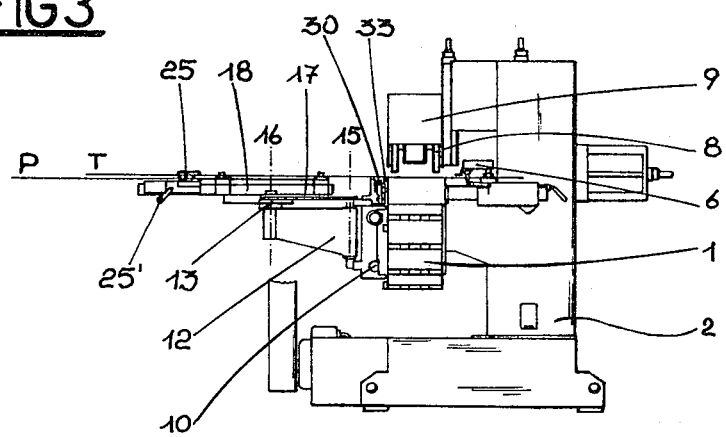
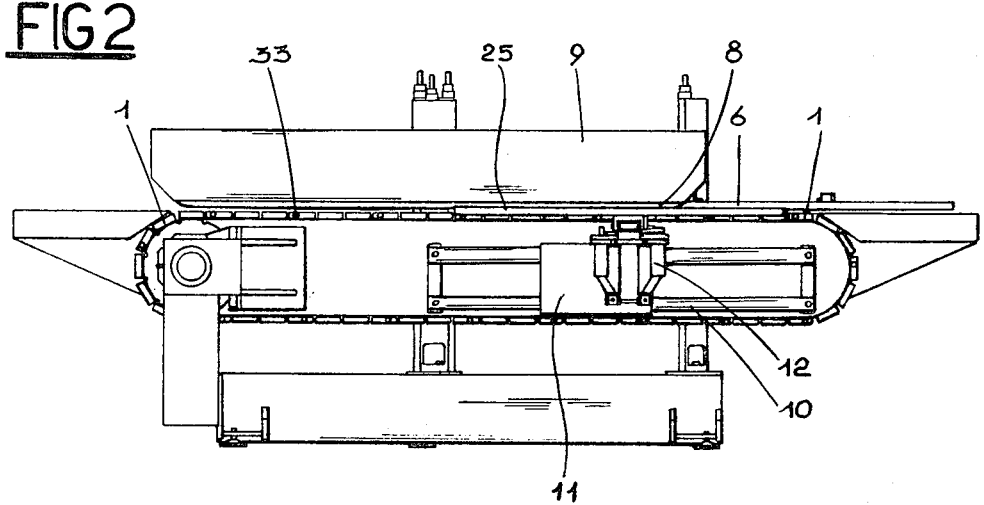

MACHINE FOR MACHINING PANELS, PLANKS AND SECTIONS OR SIMILAR, IN PARTICULAR FOR WOOD AND THE DERIVATIVES THEREOF

SUMMARY OF THE INVENTION

The invention relates to a machine for automatically machining, at a number of operating stations, panels, planks and sections or similar made of wood or of the derivatives thereof.

The said machine comprises a plurality of operating stations (4) placed in line along the path followed by an automatic, continuous, track type conveyor which is provided at the top, over the full length thereof, with guides shoes (8), in between which the panel is gripped and is thrust towards the aforementioned stations; the said machine comprises, furthermore, at the side of the said continuous conveyor, a flat horizontal carriage that is partially in the same plane as the surface on which the panel rests on the above mentioned conveyor, and is movable horizontally, in the two directions, along the infeed path followed by the latter.

The said carriage, which is provided with locator members (20) for positioning the panel with respect to the said infeed direction, thus has the dual task of placing the panel at the desired machining angle and of feeding it to the said automatic machining line.

DESCRIPTION OF THE INVENTION

A considerable variety of machines for machining materials made of wood or of the derivatives thereof currently exist, and these can virtually be divided into two main categories.

To the first belong the machines that are known as manual machines, used at the present time by small and medium size artisan concerns, which essentially consist of a bsae frame, the upper part of which defines a horizontal working surface from which protrude the various tools used, these most frequently being a circular saw and a router for special machining operations (or just a circular saw by itself in the case of extremely cheap machines); at the side of the said frame the said machines have a flat, horizontal carriage coplanar with the said working surface, the said carriage being able to move horizontally in the two directions under the manual thrust of the operator or else, in the case of more sophisticated methods, under action that is mechanical or in some way assisted.

The said carriage has locator members for positioning the panel in such a way as to be able to orientate it in the desired direction with respect to the cutting plane defined by the fixed tool.

The feeding of the panel to the tool is, therefore, effected by the operator through the movement of the said carriage in one direction, while the movement in the other direction of the said carriage constitutes the non-active return travel thereof.

Apart from the said manual machines with a short or long carriage, and with or without a fixed or angularly movable router, there are what are known as the automatic machines, which are constituted by a continuous conveyor (of the belt or track type, etcetera) placed along the frame of the machine, along which are located the most varied stations for machining the workpiece, such as, for example, a planing and moulding unit where the workpiece is rested on the said conveyor (moved by upper or lower rollers) and it is possible to machine it, during the movement thereof, contemporaneously on all four sides. This type of machine is, however, used solely for machining workpieces whose length predominates over the other two dimensions.

To the second category belong still more sophisticated machines composed of two machining lines, one parallel with the other, each of which comprises a continuous infeed conveyor (generally of the track type) and a number of operating stations placed along the said conveyor. One of the said lines is fixed, while the other is movable parallel to itself so as to allow the tools to be positioned compatibly with the width of the panel to be machined, the infeed phase of the two conveyors, which obviously have to be driven in unison, being maintained by a long drive crossbar.

It is, therefore, possible on these machines to contemporaneously machine two opposite sides of a panel or of a workpiece and then to machine, at a subsequent stage, the remaining sides but only perpendicularly to those first machined, that is to say, it is not possible to perform machining operations on panels that have sides that slope with respect to one another, without carrying out difficult positioning manoeuvres on the conveyor tracks, such as to require extremely complex adjustments to be made, in addition to the fact that the said automatic machines are certainly not cheap and in the reach of small or medium size industries or for small quantities of workpieces.

The main object of the invention is to overcome the aforementioned difficulties through the creation of a machine provided with a line for the automatic, continuous, infeed of the workpieces to the various operating stations and with which, furthermore, it is possible to perform machining operations on the said workpieces in directions that slope at variable angles, with these varying constantly, and to do so using methods that are simple and economical, above all in comparison with the results achieved therewith.

This and other objects too are all attained with the machine in question, essential features of which are that it comprises a plurality of operating stations placed in line along the path followed by a continuous conveyor, movable in the infeed direction, and provided at the top with means of restraint for gripping, together with the said conveyor, the workpiece being infed, the said machine being characterized, furthermore, by the fact that it comprises at least one carriage for supporting and infeeding the workpieces, positioned at the side of the said conveyor and movable, in the two directions, along the path followed for the advancement of the said conveyor.

In one preferred form of embodiment, the said machine is characterized on account of the fact that it comprises at least one element for coupling the said carriage to the said conveyor during the travel in the infeed direction, with means being provided to uncouple the said element during the return travel of the said carriage.

Further characteristics and advantages of the invention will emerge more obviously from the detailed description that follows of one preferred form of embodiment, illustrated purely as an unlimited example on the accompanying drawings, in which:

FIG. 1 shows the machine in question in a plan view;

FIG. 1a shows a plan view of a panel to be worked on;

FIGS. 2 and 3 show the machine in question in lateral views from A and B, respectively, in FIG. 1;

FIG. 2a is a lateral view of the coupling between the conveyor and the carriage;

Figure 4:
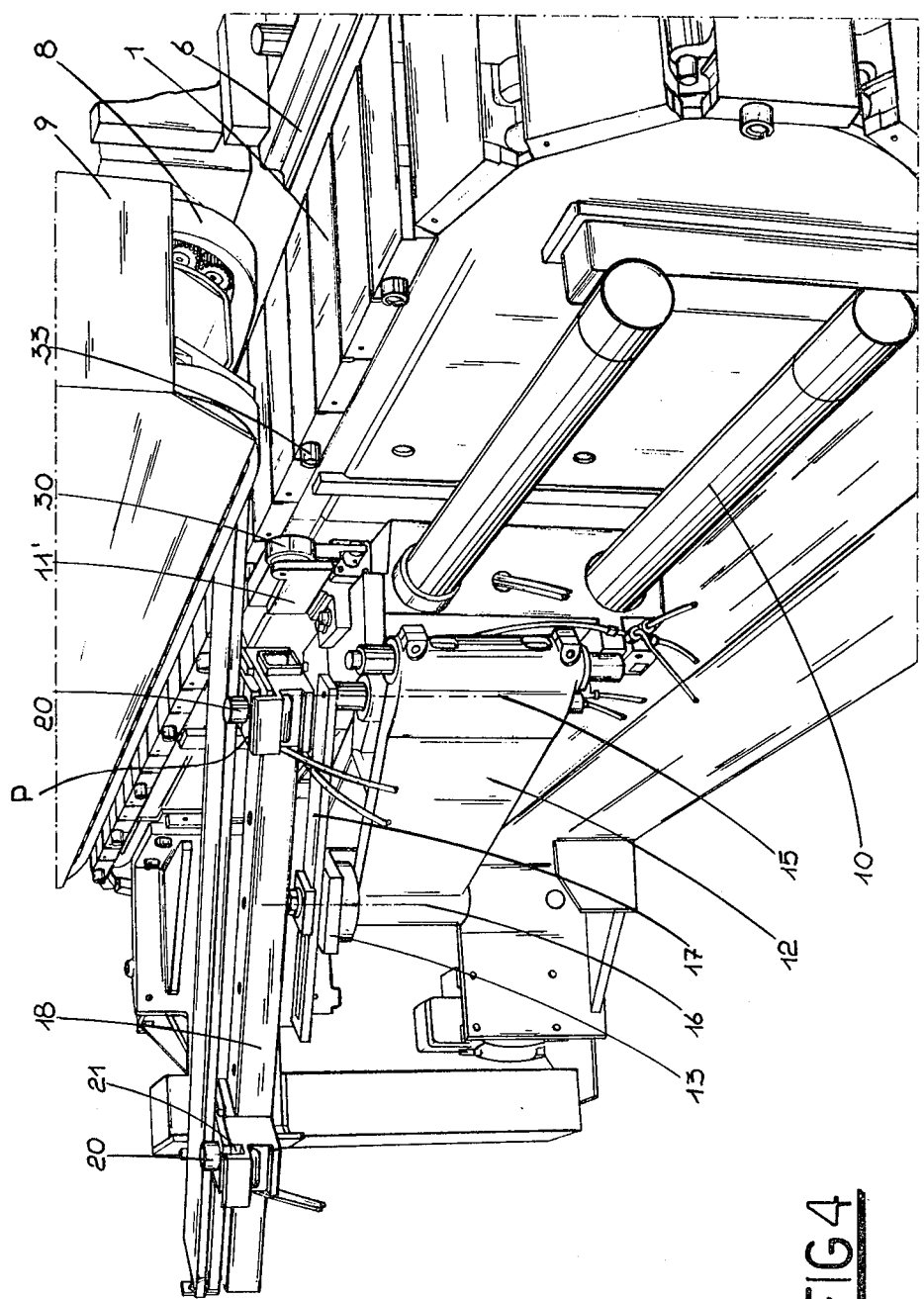
FIG. 4 shows the machine in question, in a diagrammatic perspective view, during one particular stage in the machining.

With reference to the accompanying figures, at (1) there is a horizontal, continuous, track type conveyor, supported by the frame of the machine (2) which, in a known fashion, is wound on to extremity pulleys or drums, the drive one of which is moved by a motor (3) which keeps the conveyor in constant motion.

The said conveyor defines a machining line whose stations, also of a known type, shown globally at (4), each of which attends to one well defined operation, are all placed on the same side along the infeed path (x—x) followed by the conveyor, the direction of which is, instead, shown at (5).

On the same side as the operating stations, shown at (6) there is a locator device, in the form of an articulated parallelogram, for positioning the workpiece with respect to the ideal machining line.

Above the continuous conveyor (1) are placed a pair of belts (8) which are also wound, in an idling endless fashion, on to extremity drums with horizontal axes, kept under tension by a plurality of elastic restraining members of a known type which are contained inside the casing (9) visible in the figures, and thus act as an element for gripping, together with the conveyor, the piece to be subjected to machining.

On the side of the conveyor opposite that provided with the said stations, the base frame is integral with two horizontal, parallel, bars (10) that are arranged vertically one with respect to the other and extend only over a section of the conveyor (1), and more precisely in the region of the front infeed extremity of the piece to be machined.

The said bars serve as a guide for a carriage (11) which, in turn, supports, in an overhanging fashion, three members (12), (13) and (14), and all four define an articulated quadrilateral, movable in a horizontal plane (see FIG. 1). In between the fulcrum points (15) and (16) (or similarly in between the remaining two), that is to say along one diagonal of the said articulated quadrilateral, is then placed in a tie rod (17), adjustable in length, the lengthening and shortening of which, with the relevant locking in the required position, makes it possible to position the quadrilateral and, in consequence, the connecting rod type member (13) at the desired angle with respect to the axis (x—x).

The said member (13) is fixedly connected to a bar (18) placed perpendicularly thereto and perpendicular, in the centred position of the said quadrilateral corresponding to the continuation of FIG. 1, to the said axis (x—x). The said bar (18) constitutes the member for supporting a pair of locators (20), constituted by pistons movable vertically, for example under pneumatic action, inside corresponding housings (21), in between two furthermost positions, that is to say, an upper locating position, as shown in FIG. 4, when the locators are fully outside the horizontal plane defined by the said housings, way past the plane of the conveyor (1), and a lower non operative position when the said pistons are contained inside the said housings (21), the upper surface (P) of which is placed at a height slightly below that of the horizontal surface (T) of the conveyor (1), respectively.

The said housings can be positioned along the bar (18), under the action of locking means (21'), and the pistons (20) are aligned with each other in such a way as to define, at the front and at the rear, two reference lines $L_1$ and $L_2$ perfectly perpendicular, in the position shown in FIG. 1, to the axis (x—x). The free extremity of the said bar (18) has a horizontal removable guide (25) that can be positioned along the axis (y—y) of the bar (18) by means of locking means (25'), the said guide being perpendicular to the axis of the bar (18) and, therefore, in the position shown in FIG. 1, parallel to the axis (x—x) of the conveyor (1).

At (30) there is a coupling member (see the detail in FIG. 2a) pivoted horizontally at (31) to a projection (11') on the carriage (11) in proximity of the track type conveyor (1), provided, almost in the region of the free extremity thereof, with a seating (32) that can be coupled to the corresponding projection (33) to be found laterally on each track of the conveyor or, as in the solution illustrated, at intervals every (n) tracks. The coupling and the uncoupling of the said member (30) is controlled by a pneumatic piston (34), integral with the carriage (11), which can be actuated manually by the operator or automatically by the said carriage to suit the positions adopted by this.

The function of the said coupling member is that of ensuring that the group constituted by the carriage (11) and the bar (18) moves harmoniously and always in perfect timing with the infeed conveyor which, in the region of the tracks thereof, will be provided with locator members (40) that, in the condition shown in FIG. 1, that is to say, the carriage (11) being coupled to the conveyor (1) by means of the members (30)–(33), can be aligned perfectly with the reference lines $L_1$ and $L_2$ for the workpiece, to which prior reference has been made (insofar as FIG. 1 is concerned, the locator member (40) is aligned with the line $L_1$).

The said locator (40) which, in the preferred version will be constituted by a bar of a length also equal to the width of the track constituting the conveyor (1), can be placed manually in position to suit the machining to be carried out, as will be seen below; alternatively to the foregoing, the said locator (40) can be formed by a pair of positioning members that project from the said track and can be retracted when not in use.

At (50) there is an element on which the workpiece being machined can be rested, and this, integral with the bar (18) and coplanar, at the top, with the surface of the conveyor (1), acts as the platform on which the piece undergoing machining rests when there is a certain extension thereof crosswise to the machine itself. The rolling surfaces (51) and (52), which can be provided either jointly or individually and can be separate from the machine in question, though such as to be in the same plane as the surface of the conveyor (1), have identical functions.

The utilization of the machine will now be examined for the machining of a panel as per FIG. 1a, for example, having its opposite sides parallel two by two and one perpendicular with the other. The machine is positioned as shown in FIG. 1 with the axis (y—y) of the bar at a right angle to the axis (x—x) of infeed of the conveyor, the latter being provided with continuous motion in the direction shown at (5).

The side ($P_1$) of the panel is placed in contact with the locator device (6) and the panel is rested manually on the conveyor (1) and is fed towards the gripper belts (8) provided overhead. Once the panel has been grasped by the group (1–8), it moves forward automatically and is machined along the side ($P_1$).

Now that the side ($P_1$) has been defined, the guide (25) is positioned at a distance away from the tools equal to the width (H) of the panel and the carriage (11) is carried (manually or automatically) into position ($C_1$) resting thereon the workpiece with the side ($P_1$) flush up against the guide (25), after which the carriage is pushed in the direction shown at (5) and the coupling between the member (30) and one of the projections (33) is made to come about, the purpose of this being to ensure the workpiece entering the conveyor at the same speed of movement up until when the panel is 'captured' by the group (1–8) and is machined along the side ($P_2$) parallel to the previous side ($P_1$).

When the carriage (11) reaches the limit of the bars (10), it intercepts a sensor (M) which actuates the uncoupling of the member (30) thereby permitting the carriage to return (manually or automatically) to position ($C_1$) for the insertion of a fresh panel, while the previous one continues its machining since an infinite number of operating stations can be arranged downstream of the machine.

Returning now to the example given, for the machining of the side ($P_3$) the raising of the locators (20) is brought about and the member (40) is placed in alignment with the line ($L_1$). With the carriage in position ($C_1$) the previously machined side ($P_2$) is rested on the locators (20), the carriage is pushed and it is made to be coupled to the conveyor (1) with a repetition, therefore, of the phase described above with the sole difference that the tripping of the sensor (M) also causes the locators (20) to move downwards in such a way that the carriage can be returned to position ($C_1$) with a movement beneath the panel but in the opposite direction to (5). This is possible since the panel rests, as stated, just on the conveyor (1) and on one of the support members (50), (51) or (52) but not on the housings (21), the reason for this having been stated earlier on.

Likewise for machining the side ($P_4$). If, instead, it is wished to machine the panel at a preferred angle, the bar (18) is positioned, by moving the articulated quadrilateral (11), (12), (13) and (14) until the line ($L_1$) is placed, for example, in position ($L_1$) (see in FIG. 1 the dotted line position ($C_2$)) of the carriage, angled at with respect to the axis (y—y), with it obviously being possible to read the angle on the graduated scale provided for this purpose.

The machining of the panel would take place in accordance with FIG. 4 resting it (at the front or at the rear) on the positioning locators (20) and pushing the carriage from the habitual commencing position ($C_1$) (angled on this occasion) towards coupling with the conveyor, with the succession of phases being exactly as previously outlined.

Apropos the foregoing, the aforementioned articulated quadrilateral has been calculated in such a way that the axis of the bar (18) is always kept incident at the same point (I) with the axis (x—x) of the conveyor so as to have a perfect alignment between the locators (20) and (40).

It can thus be seen that the machine in question offers the double advantage of continuous machining provided by the automatic machining line constituted by the group consisting of the conveyor (1) and the operating stations (4), together with an infeed of the panel or workpiece through the utilization of a carriage that can be manoeuvred with discontinuity; more precisely, with the carriage used it is possible to position (at the required angle) the workpiece with respect to the infeed and machining direction and to send it, in the said stable position, towards the automatic machining stations, and to return the carriage to the position for the charging of a fresh workpiece while the preceding one continues to be machined by the automatic line.

The said machine can machine workpieces of any size, even of very reduced dimensions, and this is because the conveyor (1) is of a width sufficient to grasp small size workpieces, the positioning of which is effected through the member (40) and the forward movement of which is attended to by the conveyor (1)-belt (8) group. In this connection, the tracks can be faced with a suitable elastic material that has a high friction coefficient.

In the solution that has been examined, the carriage has always defined a horizontal plane though it is obvious that support members angled with respect to the plane shown in FIG. 1 can be placed thereon for machining workpieces that are not flat, just as the machining lines may be doubled, with additional operating stations being placed on the other side of the conveyor (1) with respect to the said stations (4), supported in an overhanging fashion by the base frame (2).

In its practical form of embodiment the invention can also adopt forms that differ from what has been described above and, in particular, numerous modifications of a practical nature may be introduced without there being any deviation from the framework of protection afforded to the invention.

What is claimed is:

1. Machine for machining workpieces, such as panels, planks and sections or similar, in particular for wood and the derivatives thereof, said machine comprising:
   conveying means for conveying workpieces in an infeed direction along a conveying line;
   gripping means disposed above and cooperating with said conveying means for gripping workpieces being infed;
   a plurality of operating stations fixed in position along said conveying line for performing machining operations on workpieces being infed by said conveying means and said gripping means;
   carriage means cooperating with said conveying means for supporting and for infeeding workpieces, said carriage means being positioned at the side of the conveying means and being movable in the infeed direction and in a return direction opposite the infeed direction, said carriage means supporting a support surface for supporting a portion of a workpiece projecting laterally from the conveying means, and having means for adjusting the lateral spacing between said support surface and said conveying means to accommodate different size workpieces; and
   means for coupling said carriage means with said conveying means for conjoint movement therewith.

2. Machine according to claim 1, wherein said means for coupling comprises at least one member for coupling said carriage means to said conveying means during the travel in the infeed direction, and means for uncoupling said member during return travel of said carriage means.

3. Machine according to claim 1, further comprising a pair of horizontal bars extending parallel to the direction of said conveying line for supporting and for guiding movement of said carriage means.

4. Machine according to claim 3 or 1, wherein said carriage means comprises a plurality of members cooperating to form an articulated quadrilateral, and a bar supported by said articulated quadrilateral in such manner that the angle formed between the axis of the bar and the conveying line is adjustable.

5. Machine according to claim 4, wherein the axis of the bar defines, in the centered position of the said articulated quadrilateral, a right angle with respect to the said conveying line, said machine further comprising at least one locator member supported by said bar and movable vertically between two positions, namely, an upper position above the top surface of the said bar and above the horizontal plane of the conveying means, and a lower non-operative position below the top surface of the said bar and beneath the plane of the said conveying means.

6. Machine according to claim 5, wherein the said bar is provided with at least two locator members.

7. Machine according to claim 5, further comprising locator means carried by said conveying means and cooperating with said locator member for locating workpieces being machined in desired positions with respect to said conveying means.

8. Machine according to claim 7, wherein the said bar is provided with at least two locator members.

9. Machine according to claim 5, wherein the said locator member comprises a housing, and a piston movable with respect to the housing to protrude above or retract below the top surface of the said housing, the latter being supported by said bar and having a top surface (P) thereof placed at a lesser height than the top surface (T) of the conveying means.

10. Machine according to claim 4, wherein said support surface comprises a guide placed perpendicularly to the bar and removable there from, a portion of said guide extending above the top surface of the said conveying means.

11. Machine according to claim 4, wherein said support surface comprises at least one workpiece support member positioned on said bar in the same plane as the top surface of said conveying means.

12. Machine according to claim 1, wherein the said conveying means is constituted by a track conveyor provided at the top with a covering made of high friction coefficient material.

13. Machine according to claim 2, further comprising a projection on the carriage means in proximity of the conveying means, said member for coupling being pivotally mounted on said projection and having a seating formed at an extremity thereof, corresponding projections being provided laterally on the said conveying means so that engagement between said seating and one of said projections couples said carriage means with said conveying means.

* * * * *